June 2, 1964 S. H. JACKSON 3,135,033
GRIPPER FOR CABLES AND THE LIKE
Filed June 8, 1960

INVENTOR.
SAMUEL HENRY JACKSON
BY
Bierman + Bierman
ATTORNEYS 3,135,033
GRIPPER FOR CABLES AND THE LIKE
Samuel Henry Jackson, Ardsley, N.Y., assignor to Kings Electronics, Inc., a corporation of New York
Filed June 8, 1960, Ser. No. 34,817
3 Claims. (Cl. 24—122.3)

This invention relates to means for securing pieces of cable together, more specifically to a form of composite fitting particularly adapted for use with coaxial cable having aluminum sheathing.

In the past, many devices for locking segments of cable together have been devised. However, all of these suffer from certain defects which it is the object of this invention to correct.

There has long been a need for a cable locking device which can be easily and simply installed by an unskilled workman and which can positively and permanently be fixed at a specific point on the cable. The purpose of such devices is to provide grips upon which various fittings can be mounted. The devices of the prior art are difficult to locate accurately along the cable and are not permanent when finally attached.

It is therefore among the objects of this invention to provide a cable locking device of simple and foolproof character, such that it can be readily installed by an unskilled workman.

It is also among the objects of this invention to provide a cable locking device which can be installed without the use of special tools.

It is further among the objects of this invention to provide a cable locking device which is capable of accurate location at any given point on the cable.

It is still further among the objects of this invention to provide a cable locking device which when placed in position is permanently locked on the cable.

In practicing this invention there is provided a bearing washer of substantially disk-like shape having a hole in the center, adapted to receive the cable upon which the locking device is to be placed. There is also provided a gripper having a circular inner periphery, with a plurality of inwardly extending prongs mounted thereon. The prongs do not extend inwardly in a direction perpendicular to the axis of the cable but are placed at an angle thereto so that they extend inwardly and away from the gripper.

From a manufacturing standpoint, it has been found that if the gripper is in the form of a hollow cylinder with the prongs extending from the periphery of one end thereof and a filler ring of suitable size and shape is inserted into the cylindrical portion of the gripper, substantially the same result will be obtained as with a one-piece gripper made from a solid disk with prongs extending therefrom.

It will be appreciated that the hollow cylindrical gripper may be formed more readily than the solid member and the filler ring is a standard item which may be purchased or manufactured with little difficulty.

It is preferable for proper permanent location of this device to provide two opposed grippers separated by the bearing washer.

In operation, the device is affixed as follows: A locking nut with its unthreaded portion facing away from the end of the cable is slid onto the cable. Next a gripper with its filler ring is placed on the cable with the prongs facing the end of the cable. This is followed by the bearing washer.

A second gripper with its filler ring is then slid onto the cable with the prongs facing the bearing washer and finally a deforming nut is placed on the cable with its threads facing the threads of the locking nut.

The precise point at which the device is to be mounted is determined by the position of the bearing washer. This is set in accordance with any desired relationship between the locking device and the cable and the two grippers with their filler rings are brought into contact with opposite sides of the washer. The locking nut and the deforming nut are then brought into threaded engagement with each other and tightened.

The tightening of these nuts causes the grippers to be pressed against the bearing washer, which in turn deforms the prongs and causes them to dig into the cable sheath, thereby permanently locking the device against axial motion in either direction.

In the accompanying drawing constituting a part hereof and in which like reference characters indicate like parts, FIG. 1 is an exploded perspective view of the locking device and all its components;

Figure 1:
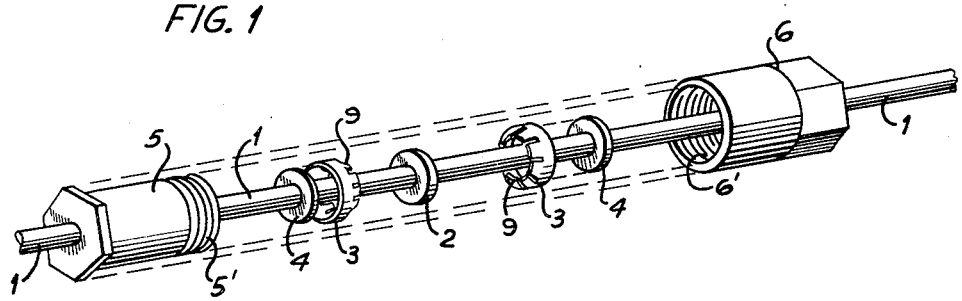

The device is associated with a cable 1 or the like which, in this case consists of a central conductor 7 with a conducting sheath 8 concentric therewith and separated therefrom.

On sheath 8 is a bearing washer 2 placed at the point where the gripping device is to be fixed. A pair of cylindrical grippers 3 on opposite sides of washer 2 have a series of prongs 9 extending inwardly at an angle to the axis so as to contact washer 2. The grippers are made of spring metal, such as Phosphor bronze. Filler rings 4 are held in the cylindrical part of said grippers. A deforming nut 6 having internal threads 6' fits over the assembly of washer and grippers and a complementary locking nut 5 having external threads 5' cooperates with nut 6.

Figure 2:
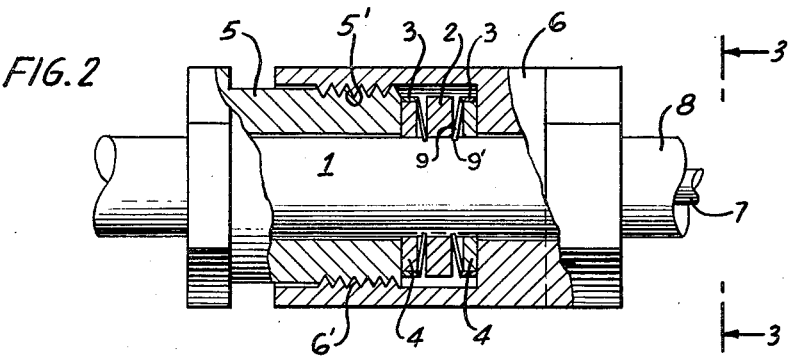
FIG. 2 is a view partly in section showing the locking device when permanently set in place.

In operation, washer 2 is placed at the point where the grip or clamp is to be made, and grippers 3 and rings 4 are placed on cable 1. Nuts 5 and 6 are threaded together as shown in FIG. 2 whereby prongs 9 contact washer 2 and, as the threading is completed, the prongs assume a position perpendicular to the axis of the cable. The ends of the prongs dig into sheath 8 to grip it without breaking through, as shown at 9'.

Figure 4:
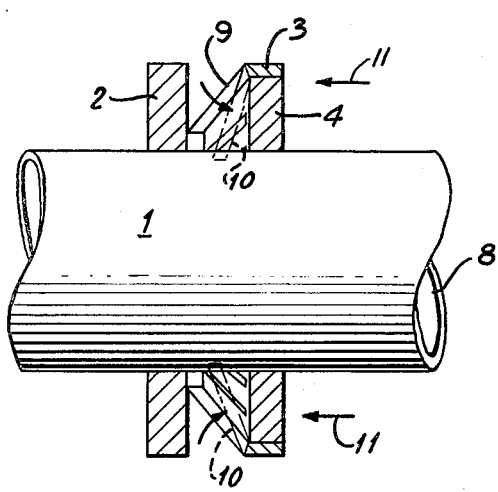
FIG. 4 is an enlarged view partially in section, showing the action of the prongs resulting from the compressive force exerted by the locking nut and the deforming nut.
Figure 3:
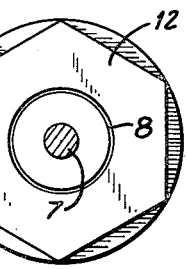
FIG. 3 is a view along line 3—3 of FIG. 2.

In the modification shown in FIG. 4, there is shown a single gripper 3 contacting one face of washer 2, before nuts 5 and 6 are threaded together to cause prongs 9 to slide to the center and dig into the face of sheath 8. Arrows 11 indicate the direction of movement to cause the gripper to assume its final position 10.

Of course, it is clear that many changes obvious to those skilled in the art may be made without departing from the spirit of this invention. For example, the outer peripheries of the washer, gripper and filler ring may be of any suitable shape which will permit the exertion of an axial compressive force on the assembly. In addition, any other means for exerting such a force may be substituted for the locking and deforming nuts with their threaded engagement.

In place of nuts 5 and 6, mechanically equivalent means may be employed for the purpose. Deforming nut 6 may be replaced by other elements as, for instance, an electrical connector, a mount, or other device. Similarly, locking nut 5 may be replaced by a different element. In the claims, these equivalents are included by the terms used therein.

These and other changes may be made in this invention without departing from the basic conception thereof and this invention is to be broadly construed and not to be limited except by the character of the claims appended hereto.

I claim:

1. A cable locking device comprising a pair of grippers, each gripper having a substantially circular periphery, a plurality of inwardly extending prongs on each of said grippers, the prongs on one of said pair of grippers being positioned in opposing relation to the prongs on the other of said pair of grippers, each gripper comprising a cylindrical shell having a pair of surfaces with the prongs on each gripper extending angularly and inwardly toward a cable sheath from one of said surfaces, means exerting pressure against the other of said pair of surfaces on each said shell thereby causing said prongs to dig into the cable sheath, and a filler ring having a diameter substantially as large as the diameter of each shell and inserted therein to provide each shell with a substantially circular periphery.

2. A cable locking device according to claim 1 wherein said pressure exerting means comprises a bearing washer on the cable between said pair of grippers, a locking nut bearing against one of said pair of grippers and a deforming nut bearing against the other of said pair of grippers, said locking nut being in engagement with said deforming nut whereby axial pressure is placed on said pair of grippers and bearing washer, causing said prongs to dig into the cable sheath.

3. A cable locking device comprising two grippers adapted to be mounted around a cable, each gripper having a substantially cylindrical shell with a plurality of angularly and inwardly extending prongs on one extremity thereof, a pair of filler rings, of a diameter slightly smaller than the diameter of each shell after insertion of a ring in each of said shells from another extremity thereof, the said prongs on one shell extending toward the prongs on the other shell, a bearing washer on the cable between said grippers, said washer being substantially disk shaped, a locking nut bearing against one of said grippers, and a deforming nut bearing against the other of said grippers, said locking nut and said deforming nut being in threaded engagement, whereby axial compression is exerted on said grippers causing deformation of said prongs into the sheath of the cable.

References Cited in the file of this patent

UNITED STATES PATENTS

| | | |
|---|---|---|
| 1,712,108 | Goeller | May 7, 1929 |
| 2,404,385 | Fritts | July 23, 1946 |
| 2,484,192 | Squiller | Oct. 11, 1949 |
| 2,689,146 | Werner | Sept. 14, 1954 |
| 2,744,436 | Ross | May 8, 1956 |
| 2,798,748 | Maurer | July 9, 1957 |
| 2,989,327 | Hermanus | June 21, 1961 |